(12) United States Patent
Wang et al.

(10) Patent No.: US 12,293,166 B2
(45) Date of Patent: May 6, 2025

(54) ENHANCED EXCEPTION HANDLING FOR DEBUGGING

(71) Applicant: INTERNATIONAL BUSINESS MACHINES CORPORATION, Armonk, NY (US)

(72) Inventors: Lei Wang, Beijing (CN); Xiao Ling Chen, Beijing (CN); Zheng Lei An, Beijing (CN); Yan Huang, Beijing (CN); Dong Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 17/648,306

(22) Filed: Jan. 19, 2022

(65) Prior Publication Data
US 2023/0229400 A1  Jul. 20, 2023

(51) Int. Cl.
*G06F 8/30* (2018.01)
*G06F 8/51* (2018.01)

(52) U.S. Cl.
CPC . *G06F 8/30* (2013.01); *G06F 8/51* (2013.01)

(58) Field of Classification Search
CPC .................................. G06F 8/30; G06F 8/51
USPC ........................................ 717/110–112, 124
See application file for complete search history.

(56) References Cited

U.S. PATENT DOCUMENTS

| | | | |
|---|---|---|---|
| 8,762,953 B2 * | 6/2014 | French | G06F 9/3861 714/45 |
| 11,544,099 B2 * | 1/2023 | Bailey | G06F 8/31 |
| 2017/0300400 A1 | 10/2017 | Davis | |
| 2020/0192785 A1 | 6/2020 | Chen | |

FOREIGN PATENT DOCUMENTS

| | | |
|---|---|---|
| CN | 105824754 B | 8/2016 |
| CN | 106599628 B | 4/2017 |
| CN | 112181815 A | 1/2021 |

OTHER PUBLICATIONS

Shah et al., "Why Do Developers Neglect Exception Handling?", 2008, ACM, pp. 62-68. (Year: 2008).*
Stack Overflow, "General decorator to wrap try except in python?", 2014, https://stackoverflow.com/questions/15572288/general-decorator-to-wrap-try-except-in-python , 13 pages. (Year: 2014).*
(Continued)

*Primary Examiner* — Ted T. Vo
(74) *Attorney, Agent, or Firm* — Randy Tejeda

(57) ABSTRACT

A method, system, and computer program product for improving debugging efficiency through fallibility skip functionality are provided. The method initiates a fallibility skip mode within a programming environment. The method identifies a code module to be translated from a first coding language to a second coding language. The code module including a function statement. A modified function statement is generated based on the function statement and the initiation of the fallibility skip mode. One or more exception handling functions are added based on the modified function statement and the fallibility skip mode. The method generates a modified code module in the second coding language based on the fallibility skip mode.

15 Claims, 6 Drawing Sheets

(56) References Cited

OTHER PUBLICATIONS

Stack Overflow, "How to skip over line throwing exception when debugging", 2017, https://stackoverflow.com/questions/45746921/how-to-skip-over-line-throwing-exception-when-debugging, 3 pages (Year: 2017).*

Zhang et al., "Accelerating Iterators in Optimizing AST Interpreters", 2014, ACM, pp. 727-743. (Year: 2014).*

Mell et al., "The NIST Definition of Cloud Computing," Recommendations of the National Institute of Standards and Technology, U.S. Department of Commerce, Special Publication 800-145, Sep. 2011, 7 pgs.

Van De Vanter et al., "Fast, Flexible, Polyglot Instrumentation Support for Debuggers and other Tools, " arXiv 1803.10201, Mar. 27, 2018, 30 pages.

"IBM/clai: Command Line Artificial Intelligence or CLAI is an open-sourced project from IBM Research aimed to bring the power of AI to the command line interface", GitHub, downloaded from the Internet on Aug. 11, 2023, 7 pages, <https://github.com/IBM/clai>.

* cited by examiner

ENHANCED EXCEPTION HANDLING FOR DEBUGGING

BACKGROUND

Programming languages handle exceptions in different ways. Some programming languages provide exceptions at the beginning of a new project or when adding new features. Some programming languages throw exceptions only if a program is started and a statement leading to the exception is executed. In some programming languages, where an exception is thrown, a program terminates if no exception handling is provided.

SUMMARY

According to an embodiment described herein, a computer-implemented method for improving debugging efficiency through fallibility skip functionality is provided. The method initiates a fallibility skip mode within a programming environment. The method identifies a code module to be translated from a first coding language to a second coding language. The code module including a function statement. A modified function statement is generated based on the function statement and the initiation of the fallibility skip mode. One or more exception handling functions are added based on the modified function statement and the fallibility skip mode. The method generates a modified code module in the second coding language based on the fallibility skip mode.

According to an embodiment described herein, a system for improving debugging efficiency through fallibility skip functionality is provided. The system includes one or more processors and a computer-readable storage medium, coupled to the one or more processors, storing program instructions that, when executed by the one or more processors, cause the one or more processors to perform operations. The operations initiate a fallibility skip mode within a programming environment. The operations identify a code module to be translated from a first coding language to a second coding language. The code module including a function statement. A modified function statement is generated based on the function statement and the initiation of the fallibility skip mode. One or more exception handling functions are added based on the modified function statement and the fallibility skip mode. The operations generate a modified code module in the second coding language based on the fallibility skip mode.

According to an embodiment described herein, a computer program product for improving debugging efficiency through fallibility skip functionality is provided. The computer program product includes a computer-readable storage medium having program instructions embodied therewith, the program instructions being executable by one or more processors to cause the one or more processors to initiate a fallibility skip mode within a programming environment. The computer program product identifies a code module to be translated from a first coding language to a second coding language. The code module including a function statement. A modified function statement is generated based on the function statement and the initiation of the fallibility skip mode. One or more exception handling functions are added based on the modified function statement and the fallibility skip mode. The computer program product generates a modified code module in the second coding language based on the fallibility skip mode.

DETAILED DESCRIPTION

Figure 1:
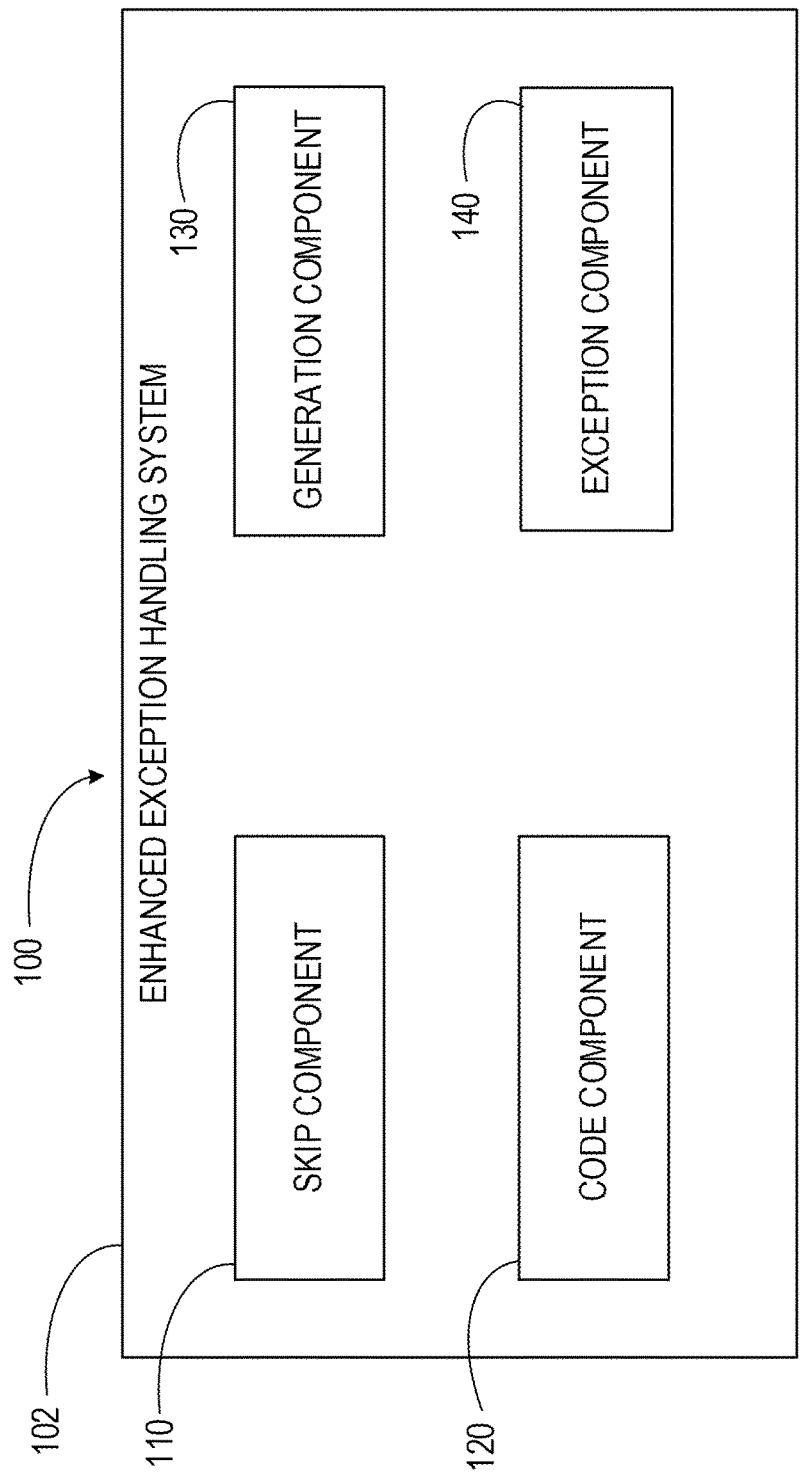
FIG. 1 depicts a block diagram of a computing environment for implementing concepts and computer-based methods, according to at least one embodiment.

The present disclosure relates generally to methods for debugging. More particularly, but not exclusively, embodiments of the present disclosure relate to a computer-implemented method for improving debugging efficiency through fallibility skip functionality. Embodiments of the present disclosure improve debugging efficiency by modifying code in a translator to automatically catch exceptions and using enhanced unwind stack mechanisms during code execution. The present disclosure relates further to a related system for enhanced debugging efficiency, and a computer program product for operating such a system.

Different programming languages have gained popularity based on industry acceptance, differing functionality, ease of use, and applicability to certain problems. Python® is a programming language that has gained prominence across multiple industries and scientific endeavors. When starting a project or adding new features in Python®, exceptions may be thrown at the beginning. An exception is thrown in Python® only where a program or newly added function is started and a statement resulting in the exception is executed. For example, an exception handling program may be searched in Python® in response to an exception being generated. If exception handling is performed or not needed, the process may continue by searching exception handling in a caller that calls a current function. If exception handling is performed in the caller or not needed, the process may continue to search a main function. The program then terminates if proper exception handling is not provided. This exception handling may prevent testing of multiple lines of code. Further, this type of exception handling can decrease efficiency and efficacy of debugging source code. This type of exception handling may also allow hidden errors to persist, such as exceptions in less frequently run functions or lines of code. For example, exceptions may not be uncovered in functions such as log printing or database writing to save data. This method of exception handling may necessitate programmers to debug unimportant or miniscule exceptions to move the debugging process along to more serious coding issues. Exception handling in this manner may increase time and cost in debugging of source code. For example, this exception handling may increase time or prerequisites/setups to start a program. In some instances, this exception handling causes exceptions, which only affect themselves and not other functions, to be handled prior to continuing the debugging process. Finally, a single exception that occurs in multiple lines of code or statements may need to be addressed multiple times in the aforementioned exception handling and debugging process.

Embodiments of the present disclosure provide a fallibility skip mode. In some embodiments, the fallibility skip mode a translator provides functionality to catch exceptions automatically for specified functions. Some embodiments of the present disclosure provide exception catching for user customized functions. Some embodiments of the present disclosure enable enhanced unwind stack mechanisms to work during execution of source code. Embodiments of the present disclosure improves debugging efficiency and exception handling. Some embodiments of the present disclosure enable resolution of exceptions quickly and efficiently while providing a more flexible debugging methodology. Some embodiments of the present disclosure provide methods and products enabling improvement of debugging efficiency for Python® programming by updating a generated Abstract Syntax Tree (AST) and introducing a new explicit fallibility skip mode in the translator. Some embodiments of the present disclosure enable the fallibility skip mode to modify the AST of an original function body by wrapping the body AST node with a try AST node statement. Some embodiments of the present disclosure enable the fallibility skip mode to modify the AST of an original function body by updating a decorator list of the original function body AST node. Embodiments of the present disclosure catch exceptions automatically for specified functions, including user-customized functions and added or modified functions.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an enhanced exception handling system 102. The enhanced exception handling system 102 may comprise a skip component 110, a code component 120, a generation component 130, and an exception component 140. The skip component 110 enables entry into a fallibility skip mode based on user interaction. The code component 120 identifies code modules and function statements within code modules for translation. The generation component 130 generates modified function statements within code modules. The exception component 140 adds exception handling functions into modified function statements and code modules. Although described with distinct components, it should be understood that, in at least some embodiments, components may be combined or divided, and/or additional components may be added without departing from the scope of the present disclosure.

Figure 2:
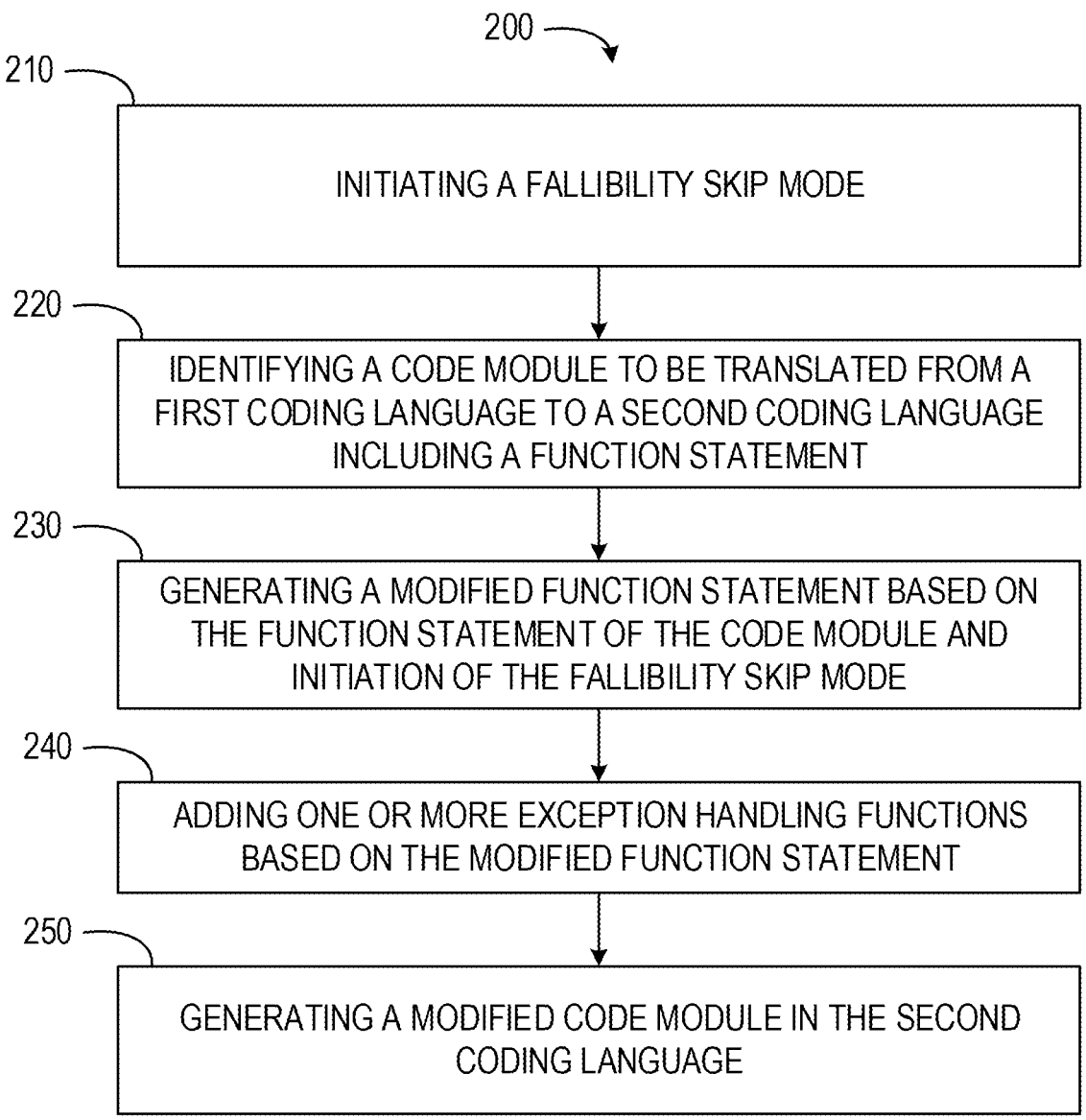
FIG. 2 depicts a flow diagram of a computer-implemented method for improving debugging efficiency through fallibility skip functionality, according to at least one embodiment.

Referring now to FIG. 2, a flow diagram of a computer-implemented method 200 is shown. The computer-implemented method 200 is a method for improving debugging efficiency through fallibility skip functionality. In some embodiments, the computer-implemented method 200 may be performed by one or more components of the computing environment 100, as described in more detail below.

At operation 210, the skip component 110 initiates a fallibility skip mode within a programming environment. The skip component 110 may initiate the fallibility skip mode based on one or more of a user interaction and a portion of code being passed through the programming environment and an AST generator. If the fallibility skip mode is not initiated, the portion of code may be passed from the AST generator to a compiler. Once the fallibility skip mode is initiated, the portion of code may be passed through components of the exception handling system 102 for modification of exception handling within the portion of code in the programming environment.

The skip component 110 may present a user interface within a programming environment. The user interface may contain one or more interface elements. The one or more interface elements may include an interface element associated with the fallibility skip mode. Selection of the interface element for the fallibility skip mode may cause the skip component 110 to initiate the fallibility skip mode. For example, a user may enable or cause the skip component 110 to initiate the fallibility skip mode by setting a global environment variable or explicit command line option (i.e., "—fallibilitySkip"). In Python®, the skip component 110 may initiate the fallibility skip mode using a command line such as "—fallibility Skip —customedFunction=<modulename.functionname>".

In some embodiments, the fallibility skip mode may be a module within a code translator of the programming environment. In such instances, the fallibility skip mode may be positioned after a frontend of the programming environment. The frontend of the programming environment may include a lexer, a parser, and an AST generator. The fallibility skip mode may receive AST information from the frontend. In some instances, the fallibility skip mode is positioned before an optimizer and a backend of the programming environment. In such instances, the fallibility skip mode passes information to an AST optimizer using an updated or modified AST. The optimizer may then pass final AST information to a compiler within the backend of the programming environment. In some embodiments, the compiler in the backend of the programming environment then outputs byte code or other suitable code in a different format than source code provided to the frontend of the programming environment.

Initiating the fallibility skip mode may reconfigure elements of the programming environment to perform operations for code generation that enable enhanced debugging and exception handling during code generation, code translation, code compiling, and code execution. In some embodiments, the fallibility skip mode reconfigures elements, portions, or functionality of a Python® programming environment. In some instances, the fallibility skip mode reconfigures an AST and a Python® translator to perform modified operations in generating, testing, and executing code generated within the programming environment. In some embodiments, the fallibility skip mode reconfigures the AST to skip an exception interruption. The fallibility skip mode may reconfigure the AST by updating a function statement of AST to catch exceptions automatically. The fallibility skip mode may reconfigure the AST by inserting specified exception handling functions. The specified exception handling functions may be applied by the AST generally or may be applied by the AST for specified functions. In some instances, the fallibility skip mode modifies elements of the programming environment to provide exception skip or raise functionality. The fallibility skip mode may also provide other options during execution of source code within the programming environment to enhance an exception unwind stack mechanism described herein.

At operation 220, the code component 120 identifies a code module to be translated from a first coding language to a second coding language. The code module may include a function statement. The code component 120 may identify the code module by receiving a set of source code. The set of source code may be generated within the programming environment. In some instances, the set of source code is provided, uploaded, or transferred to the programming environment. In some instances, the programming environment is provided access to the set of source code. For example, the code component 120 may identify the code module as source code selected for compiling, transformation into byte code, debugging, execution, or any other processing. In some embodiments, the code component 120 identifies the code module by matching module names and functions names, within a command line initiation of the fallibility skip mode, with the module and function names of the code module and function statement. For example, in a programming statement as provided below, the code component 120 may match new created functions, files, and modules; newly modified functions, files, and modules; or user specified functions, files, and modules by name matching.

```
If (newCreated) {
}
Else if (newModified) {
}
Else if (userSpecified) {
}
```

In some instances, upon receiving or otherwise being provided access to the code module, the code component 120 identifies the code module by performing a number of operations. In some instances, the code component 120 identifies the code module as a code module to be translated based on selection and submission of the code module to the code component 120. The code component 120 may engage or initiate an interpreter. The interpreter verifies that the code module, the function statements, or the instructions within the code module are well formatted. In some instances, the interpreter uses a checker to verify the code module is well formatted by checking or verifying syntax and structure of each line of code within the code module.

In some embodiments, when the fallibility skip mode is initialized, the programming environment may search exception handling in the fallibility skip mode upon identifying the code module. The user may select the fallibility skip mode to stop and raise exceptions. In some instances, the user may select the fallibility skip mode to skip and pass exceptions encountered. A determination to stop or pass exceptions may be selected at a time of initiating the fallibility skip mode or when an exception is encountered.

At operation 230, the generation component 130 generates a modified function statement. The modified function statement may be generated based on the function statement of the code module and initiation of the fallibility skip mode. The generation component 130 may modify the function statement by modifying the AST to skip default exception interruption. The generation component 130 may update or modify the function statement of AST to catch exceptions for specified functions including user-customized functions; added functions, files, modules, or packages; and modified functions, files, modules, or packages explicitly in the fallibility skip mode in a translator. The generation component 130 may generate the modified function statement as part of a translator or part within an interpreter in the programming environment. The generation component 130 may generate the modified function statement prior to or after translating the code module into an intermediate language. For example, the generation component 130 may generate the modified function statement prior to translating the code module into byte code as an intermediate language to provide the code module to a virtual machine (e.g., Python® Virtual Machine (PVM)).

In some embodiments, the generator component 130 generates the modified function statement by updating a decorator list of the function statement with a decorator function. In some instances, the generator component 130 updates the decorator list of the function statement with default decorator. The default decorator may indicate where to catch exceptions. The generator component 130 may create a new decorator function AST. The new decorator function may be created with corresponding decorator nodes. The decorator function AST may be appended with exception handling instructions. The generator component 130 may then attach corresponding decorator nodes to the function statement of the code module.

At operation 240, the exception component 140 adds one or more exception handling functions. The one or more exception handling functions may be added based on the modified function statement and the fallibility skip mode. The exception component 140 may add the one or more exception handling functions as predefined default exception handling function AST. The exception component 140 may add the one or more exception handling functions as user custom exception handling function explicitly in AST for specified functions. The specified functions may include user custom functions, added functions, or modified functions. The one or more exception handling functions may be inserted explicitly in the fallibility skip mode in a translator associated with the programming environment. For example, the one or more exception handling functions may be inserted explicitly in the fallibility skip mode in a Python® translator.

At operation 250, the generation component 130 generates a modified code module in the second coding language. The modified code module may be generated based on the fallibility skip mode. In some embodiments, the generation component 130 generates the modified code modules as a byte code version of the modified code module. In such instances, the generation component 130 incorporates a translator and a compiler configured to translate the modified code module from the first coding language to the second coding language in a properly formatted manner.

In embodiments where the decorator list of the function statement is updated with the decorator function, the generation component 130 adds the decorator function to a module body of the code module. In some embodiments, the exception component 140 adds the one or more exception handling functions to the module body of the code module with the decorator function. The generation component 130 may generate the modified code module in the second language after the decorator function has been added to the module body of the code module.

Once the modified code module is generated, the modified code module may be provided to a virtual machine, provided as compiled code, or provided as output for any other suitable purpose. In some instances, when the modified code module is executed, the provided exception skip or raise functionality of the fallibility skip mode performs customized exception handling by raising exceptions, skipping exceptions, or providing other exception handling options to enhance the exception unwind stack mechanism functionality.

Figure 3:
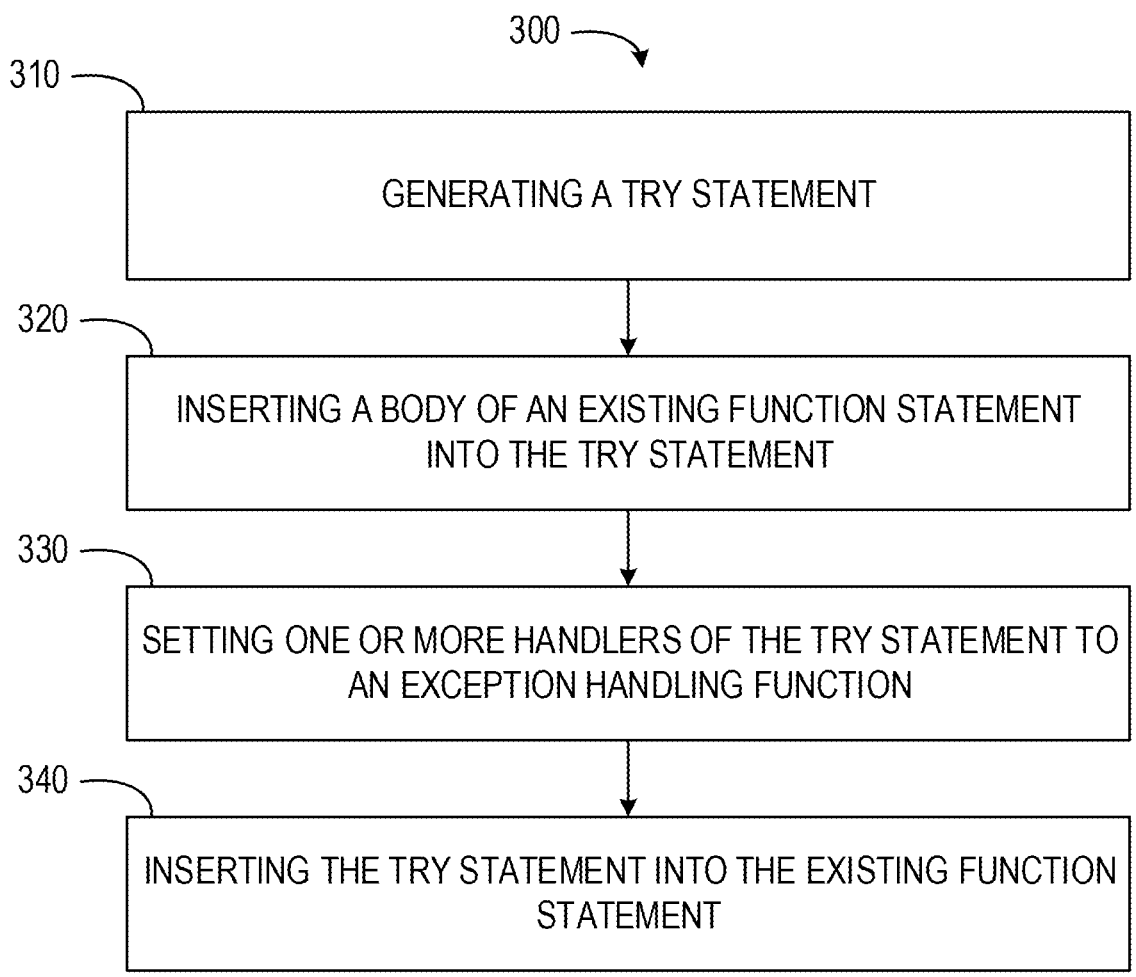
FIG. 3 depicts a flow diagram of a computer-implemented method for improving debugging efficiency through fallibility skip functionality, according to at least one embodiment.

FIG. 3 shows a flow diagram of an embodiment of a computer-implemented method 300 for improving debugging efficiency through fallibility skip functionality. The method 300 may be performed by or within the computing environment 100. In some embodiments, the method 300 comprises or incorporates one or more operations of the method 200. In some instances, operations of the method 300 may be incorporated as part of or sub-operations of the method 200, such as operations 230 and 240.

In operation 310, the generation component 130 generates a try statement. In some embodiments, the try statement is generated as an AST node. The try statement may be generated as part of operations to generate a modified function statement from an existing function statement. In some embodiments, the try statement is configured to catch one or more exceptions. The try statement may initially be an empty try statement.

In operation 320, the generation component 130 inserts a body of the existing function statement into the try statement. The generation component 130 may insert the body of the existing function statement in the try statement by wrapping the original function body AST node within the newly created try AST node.

In operation 330, the exception component 140 sets one or more handlers of the try statement to an exception handling function. The one or more handlers may be set and then appended to the try statement. The exception handling statement may be a default handling function. In some instances, the exception handling function is a custom handling function. The exception handling function may be an exception handling function of one or more exception handling functions added to the modified function statement. In some embodiments, the one or more exception handling functions is added to a module body of a code module associated with the modified function statement and the existing function statement.

In operation 340, the generation component 130 inserts the try statement into a function statement. In some embodiments, the function statement may be the existing function statement. The try statement may be added or inserted into a body of the existing function statement. In some instances, adding the try statement into the body of the existing function statement generates a modified function statement.

In some embodiments, the generation component 130 adds exception handling functionality to the code module. The exception handling functionality may be the default handling function statement or the custom handling function statement. Adding the handling functionality into the body of the code module may generate a modified code module.

In some embodiments, the exception handling functionality is added to the body of the code module by inserting the modified function statement into the body of the code module.

Figure 4:
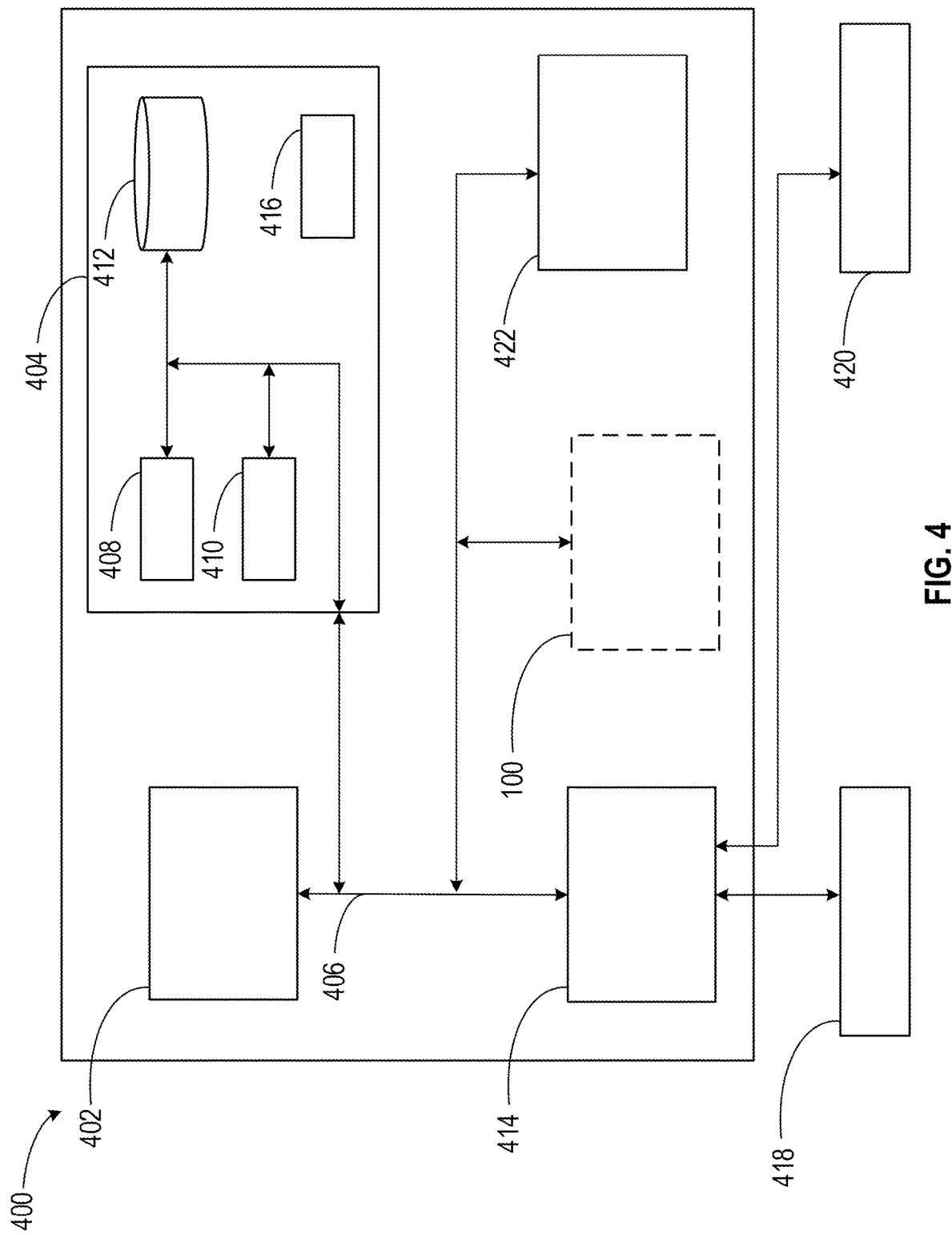
FIG. 4 depicts a block diagram of a computing system for improving debugging efficiency through fallibility skip functionality, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for improving debugging efficiency through fallibility skip functionality.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the skip component 110, the code component 120, the generation component 130, and the exception component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
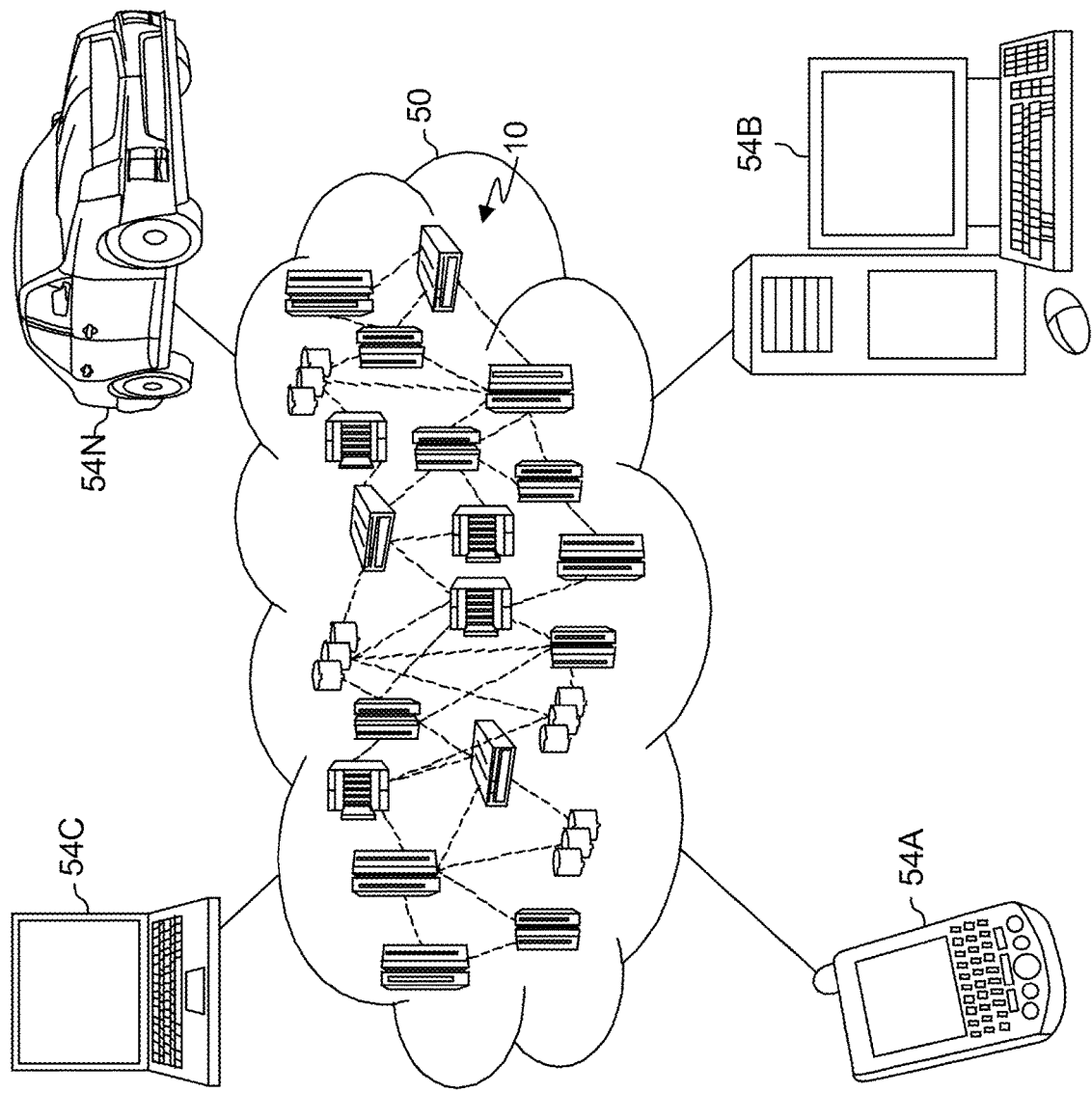
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
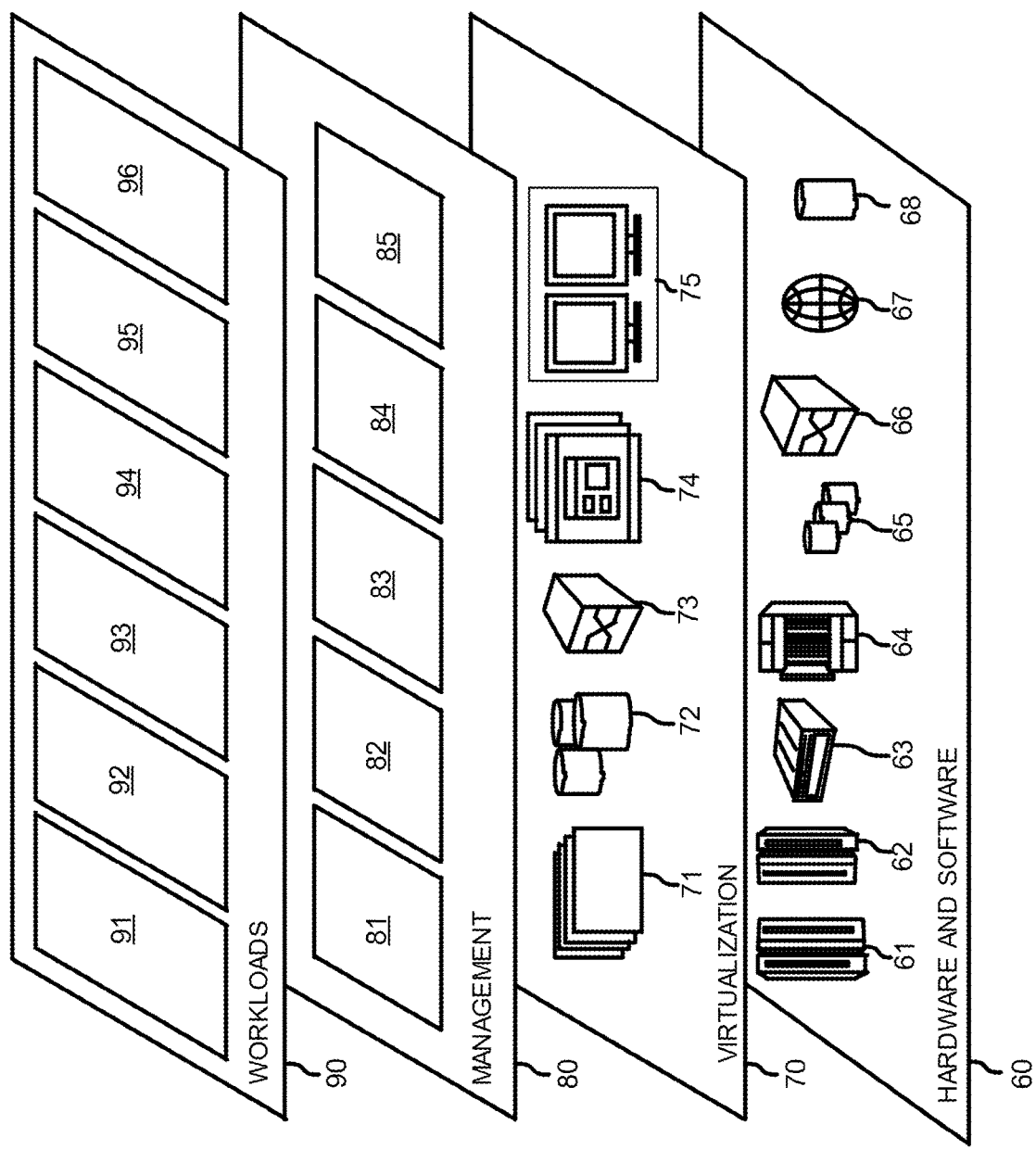
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code modification processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
  initiating, in response to a user interaction and a portion of code being passed through an automatic syntax tree (AST) generator, a fallibility skip mode within a programming environment;
  identifying a code module to be translated from a first coding language to a second coding language, the code module including a function statement of an AST;
  generating a modified function statement based on the function statement and the initiation of the fallibility skip mode, further comprising:
    updating a decorator list of the function statement with a decorator function; and
    adding the decorator function to a module body of the code module;
  adding one or more exception handling functions based on the modified function statement and the fallibility skip mode, wherein the adding comprises searching, by the programming environment and in response to the identifying the code module, exception handling in the fallibility skip mode; and
  generating a modified code module in the second coding language based on the fallibility skip mode.

2. The method of claim 1, wherein generating the modified function statement further comprises:
  generating a try statement configured to catch one or more exceptions; and
  inserting a body of the function statement into the try statement.

3. The method of claim 2, wherein the method further comprises:
  setting one or more handlers of the try statement to an exception handling function of the one or more exception handling functions; and
  inserting the try statement into the function statement.

4. The method of claim 3, wherein the one or more exception handling functions is added to a module body of the code module.

5. The method of claim 1, wherein the method further comprises:
  adding the one or more exception handling functions to the module body of the code module with the decorator function.

6. A system, comprising:
  one or more processors; and
  a computer-readable storage medium, coupled to the one or more processors, storing program instructions that, when executed by the one or more processors, cause the one or more processors to perform operations comprising:
    initiating, in response to a user interaction and a portion of code being passed through an automatic syntax tree (AST) generator, a fallibility skip mode within a programming environment;
    identifying a code module to be translated from a first coding language to a second coding language, the code module including a function statement of an AST;
    generating a modified function statement based on the function statement and the initiation of the fallibility skip mode, further comprising:
      updating a decorator list of the function statement with a decorator function; and
      adding the decorator function to a module body of the code module;
    adding one or more exception handling functions based on the modified function statement and the fallibility skip mode, wherein the adding comprises searching, by the programming environment in response to the identifying the code module, exception handling in the fallibility skip mode; and
    generating a modified code module in the second coding language based on the fallibility skip mode.

7. The system of claim 6, wherein generating the modified function statement further comprises:
  generating a try statement configured to catch one or more exceptions; and
  inserting a body of the function statement into the try statement.

8. The system of claim 7, wherein the operations further comprise:
  setting one or more handlers of the try statement to an exception handling function of the one or more exception handling functions; and
  inserting the try statement into the function statement.

9. The system of claim 8, wherein the one or more exception handling functions is added to a module body of the code module.

10. The system of claim 6, wherein the operations further comprise:
  adding the one or more exception handling functions to the module body of the code module with the decorator function.

11. A computer program product comprising a computer readable storage medium having program instructions embodied therewith, the program instructions being executable by one or more processors to cause the one or more processors to perform operations comprising:
  initiating, in response to a user interaction and a portion of code being passed through an automatic syntax tree (AST) generator, a fallibility skip mode within a programming environment;
  identifying a code module to be translated from a first coding language to a second coding language, the code module including a function statement of an AST;
  generating a modified function statement based on the function statement and the initiation of the fallibility skip mode, further comprising:
    updating a decorator list of the function statement with a decorator function; and
    adding the decorator function to a module body of the code module;
  adding one or more exception handling functions based on the modified function statement and the fallibility skip mode, wherein the adding comprises searching, by the programming environment in response to the identifying the code module, exception handling in the fallibility skip mode; and
  generating a modified code module in the second coding language based on the fallibility skip mode.

12. The computer program product of claim 11, wherein generating the modified function statement further comprises:
- generating a try statement configured to catch one or more exceptions; and
- inserting a body of the function statement into the try statement.

13. The computer program product of claim 12, wherein the operations further comprise:
- setting one or more handlers of the try statement to an exception handling function of the one or more exception handling functions; and
- inserting the try statement into the function statement.

14. The computer program product of claim 13, wherein the one or more exception handling functions is added to a module body of the code module.

15. The computer program product of claim 11, wherein the operations further comprise:
- adding the one or more exception handling functions to the module body of the code module with the decorator function.

\* \* \* \* \*